(12) United States Patent
Andoh

(10) Patent No.: US 7,246,139 B2
(45) Date of Patent: Jul. 17, 2007

(54) FILE SYSTEM FOR ENABLING THE RESTORATION OF A DEFFECTIVE FILE

(75) Inventor: Tsuyoshi Andoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 10/154,848

(22) Filed: May 28, 2002

(65) Prior Publication Data

US 2005/0076063 A1    Apr. 7, 2005

(30) Foreign Application Priority Data

Nov. 8, 2001    (JP)    ............... 2001-343598

(51) Int. Cl.
*F06F 17/30* (2006.01)

(52) U.S. Cl. .................. 707/202; 707/200; 707/204

(58) Field of Classification Search ................ 707/205, 707/206, 202, 204, 200, 162, 7, 8
See application file for complete search history.

(56) References Cited

U.S. PATENT DOCUMENTS

| | | | | |
|---|---|---|---|---|
| 4,941,059 A | * | 7/1990 | Grant | 360/72.1 |
| 5,806,072 A | * | 9/1998 | Kuba et al. | 707/200 |
| 5,832,526 A | * | 11/1998 | Schuyler | 707/205 |
| 5,907,672 A | * | 5/1999 | Matze et al. | 714/8 |
| 6,038,639 A | * | 3/2000 | O'Brien et al. | 711/114 |
| 6,041,425 A | * | 3/2000 | Kokunishi et al. | 714/37 |
| 6,377,958 B1 | * | 4/2002 | Orcutt | 707/200 |
| 6,519,762 B1 | * | 2/2003 | Colligan et al. | 717/170 |
| 7,080,105 B2 | * | 7/2006 | Nakanishi et al. | 707/204 |
| 2006/0212491 A1 | * | 9/2006 | Agrawal et al. | 707/202 |

OTHER PUBLICATIONS

Wang et al. Orientation information measure bsed image restoration, Machine Learning and Cybernetics, 2003 International Confrence, V. 5, pp. 2925-2930, Nov. 2-5, 2003.*
Richard Kenner Intergrating GNAT and GCC, Annual International Conference of Ada, p. 84-92, 1994.*

* cited by examiner

*Primary Examiner*—John Breene
*Assistant Examiner*—Baoquoc N. To
(74) *Attorney, Agent, or Firm*—Staas & Halsey LLP

(57) ABSTRACT

In the invention it is assumed that in a data recording operation, when the data recording is initiated, the data recording module writes the initial value of the file size in the new file attribute area of the directory, and when the data recording is ended, the data recording module writes the number of clusters as the file size in the new file attribute area. With this assumption, the FAT restoration module examines the file size written in the file attribute area, and distinguishes the first file for which the writing is normally terminated, from the second file for which the writing is not normally terminated. The FAT restoration module tracks the FAT chain of the first file and stores the file number of the first file in the map area corresponding to that FAT. Thereafter, the FAT restoration module tracks the FAT chain of the second file, and stores the file number of the second file in the map area corresponding to that FAT. Therefore, at the least, FATs corresponding to clusters in which data may have been recorded can be designated on the FAT map, and the FAT map can be employed to restore the FAT of the defective file.

22 Claims, 9 Drawing Sheets

NEW FILE CREATION S10

FILE CLOSING SUB-ROUTINE

FIG. 10A FAT STATE BEFORE RESTORATION

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | 01 | 02 | 03 | NL | 05 | 06 | 07 | 08 | 1A | 0A | 0B | 0C | 0D | | | |
| 0010 | | | | 13 | 14 | 15 | 16 | 17 | 18 | 19 | 1E | 1B | 1C | 1D | NL | 1F | 20 |
| 0020 | 21 | 22 | 23 | 24 | 25 | 26 | NL | | | | | | | | | |

File 1 : 00-01-02-03
File 2 : 04-05-06-07-08-1A-1B-1C-1D
File 3 : 15-16-...-19-1E-1F-20-...-26
File 4 : 09-0A-0B-0C
File 5 : 12-13-14
File 6 : 0D

FIG. 10C FAT MAP (FILE SIZE ≠ 0)

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | | 01 | 01 | 01 | 02 | 02 | 02 | 02 | 02 | | | | | | | |
| 0010 | | | | 03 | 03 | 03 | 03 | 03 | 03 | 02 | 02 | 02 | 02 | 02 | 03 | 03 |
| 0020 | 03 | 03 | 03 | 03 | 03 | 03 | | | | | | | | | | |

FIG. 10D FAT MAP (FILE SIZE = 0)

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | | 01 | 01 | 01 | 02 | 02 | 02 | 02 | 02 | | | | | | | |
| 0010 | | 05 | 05 | 05 | 03 | 03 | 03 | 03 | 03 | 02 | 04 | 04 | 04 | 04 | 03 | 03 |
| 0020 | 03 | 03 | 03 | 03 | 03 | 03 | | | | | | | | | | |

FIG. 10B FAT STATE AFTER RESTORATION

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | 01 | 02 | 03 | NL | 05 | 06 | 07 | 08 | 1A | 0A | 0B | 0C | NL | | | |
| 0010 | | | | 13 | 14 | NL | 16 | 17 | 18 | 19 | 1E | 1B | 1C | 1D | NL | 1F | 20 |
| 0020 | 21 | 22 | 23 | 24 | 25 | 26 | NL | | | | | | | | | |

FILE SYSTEM FOR ENABLING THE RESTORATION OF A DEFFECTIVE FILE

BACKGROUND OF THE INVENTION

1. Field of the Invention

The present invention relates to a file system, for which a large memory capacity recording medium, such as a hard disk, is provided which enables the restoration of a defective file generated due to an accident occurred during the recording of data, and to file management apparatus incorporated therein.

2. Related Background Arts

Heretofore, file systems incorporating hard disks have been used mainly as external storage media for computers. A file system employed for this purpose must write and read data with high reliability, and it is assumed that such a file system should normally finish a data recording operation in progress when a stoppage, such as a power loss, occurs. Thus, a function is provided for a file system for monitoring the power supply voltage, and for supplying power when the voltage is reduced, so that even if there is a sudden, complete loss of power, auxiliary power can be supplied for a short period of time to permit the data recording operation to be finished normally. Alternatively, two file allocation tables (FATs) may be provided for a file system and used for disk file management, so that following the occurrence of a stoppage, a defective file can be detected by comparing the two FATs. A file management process is thus required for a plurality of FATs.

Further, since the costs of manufacturing a large memory capacity recording media such as hard disks have been dramatically reduced, a video recorder incorporating the hard disk for recording video and sound data have been developed. Unlike computer data, the recording of video and sound data requires extremely large amounts of memory media; however, with the reduction in the costs associated with the manufacture of hard disks, as a recording media employed for a video recorder installed in homes, hard disks are gradually replacing video tapes.

A video recorder having built-in hard disk uses the MPEG2 method to encode and compress video and sound data, and records the resultant data on a recording medium, the hard disk. During reproduction, the recorded data is read from the hard disk, and a decoder converts that data into the original video or sound data, which is then output. Unlike video tape, a hard disk can be accessed randomly and can both reproduce and record data at the same time, so that video recorders having built-in hard disks are assumed to have a favorable future as home video recorders. In addition to video recorders, in consonance with the growth in popularity of broadband, the wide use of recording/reproduction apparatuses having built-in hard disks, for recording video and sound data, appears promising.

For a file system, such as a hard disk recorder, a function is required to prevent the abnormal termination of a recording operation due to a power cutoff and to avoid the production of a defective file. However, it is not preferable for, as with a file system used for a conventional computer system, a power monitoring device and a battery, or a plurality of FATS to be provided to cope with a stoppage because system manufacturing costs would be increased. While the reliability required for the recording and reproduction of video and sound data need not be as high as that required for computer data, for a file system cost reduction is a more important problem.

SUMMARY OF THE INVENTION

It is, therefore, one objective of the present invention to provide a file system which, without increasing manufacturing costs, can restore a defective file produced as the result of a stoppage, such as a power cutoff, and to also provide a file management apparatus that is incorporated into the file system.

To achieve the above objective, according to a first aspect of the present invention, a file management apparatus for a file system, which includes a data area divided into a plurality of clusters, a file allocation table (FAT) having a plurality of table areas mapped in accordance with said clusters, and a directory having a file attribute area in which at the least a file name, a head FAT pointer and a file size of a number of said clusters are recorded, comprises:

a data recording module for, during data recording, setting a head FAT address for said head FAT pointer and an initial value for said file size (cluster number) to generate a new file attribute area in said directory, for repetitively writing data in a cluster corresponding to a currently processed FAT while storing a succeeding FAT address in said currently processed FAT to generate a FAT chain, and for writing an end code in a last FAT and writing a number of used clusters as said file size in said file attribute area of said directory to finish a recording operation; and a FAT restoration module for searching said file attribute area of said directory to detect a first file whose file size is other than said initial value, for generating a FAT map by storing a file number of said first file in a map area corresponding to each FAT of the FAT chain of said detected first file, for additionally storing, in said FAT map, a file number of a second file whose file size is said initial value, and for restoring said FAT in accordance with said FAT map.

According to the present invention, it is assumed that in a data recording operation, when the data recording is initiated, the data recording module writes the initial value of the file size in the new file attribute area of the directory, and when the data recording is ended, the data recording module writes the number of clusters as the file size in the new file attribute area. With this assumption, the FAT restoration module examines the file size written in the file attribute area, and distinguishes the first file for which the writing is normally terminated, from the second file for which the writing is not normally terminated. The FAT restoration module tracks the FAT chain of the first file and stores the file number of the first file in the map area corresponding to that FAT. Thereafter, the FAT restoration module tracks the FAT chain of the second file, and stores the file number of the second file in the map area corresponding to that FAT. Therefore, at the least, FATs corresponding to clusters in which data may have been recorded can be designated on the FAT map, and the FAT map can be employed to restore the FAT of the defective file. The file number is a file ID for defining, as a directory, the location of a file from the beginning of the directory area. Therefore, the file number differs from the file name.

According to this invention, while taking into account that, in a hard disk recorder for which not very high reliability is required, stream data is recorded by the cluster unit as for data recording and reproduction, simple software, i.e., a FAT restoration module, is employed to restore a defective file.

Further, to achieve the above objective, according to a second aspect of the invention, a file system comprises a file management apparatus including the data recording module and the FAT restoration module of the first aspect, and a file apparatus having, at the least, the data area.

BRIEF DESCRIPTION OF THE DRAWINGS

FIG. 10 is a diagram showing an example for explaining the defective file restoration processing.

DETAILED DESCRIPTION OF THE PREFERRED EMBODIMENT

The preferred embodiment of the present invention will now be described while referring to the accompanying drawings. It should be noted, however, that the scope of the protection of the present invention is not limited to this embodiment, and covers the invention cited in the following claims and its equivalent.

Figure 1:
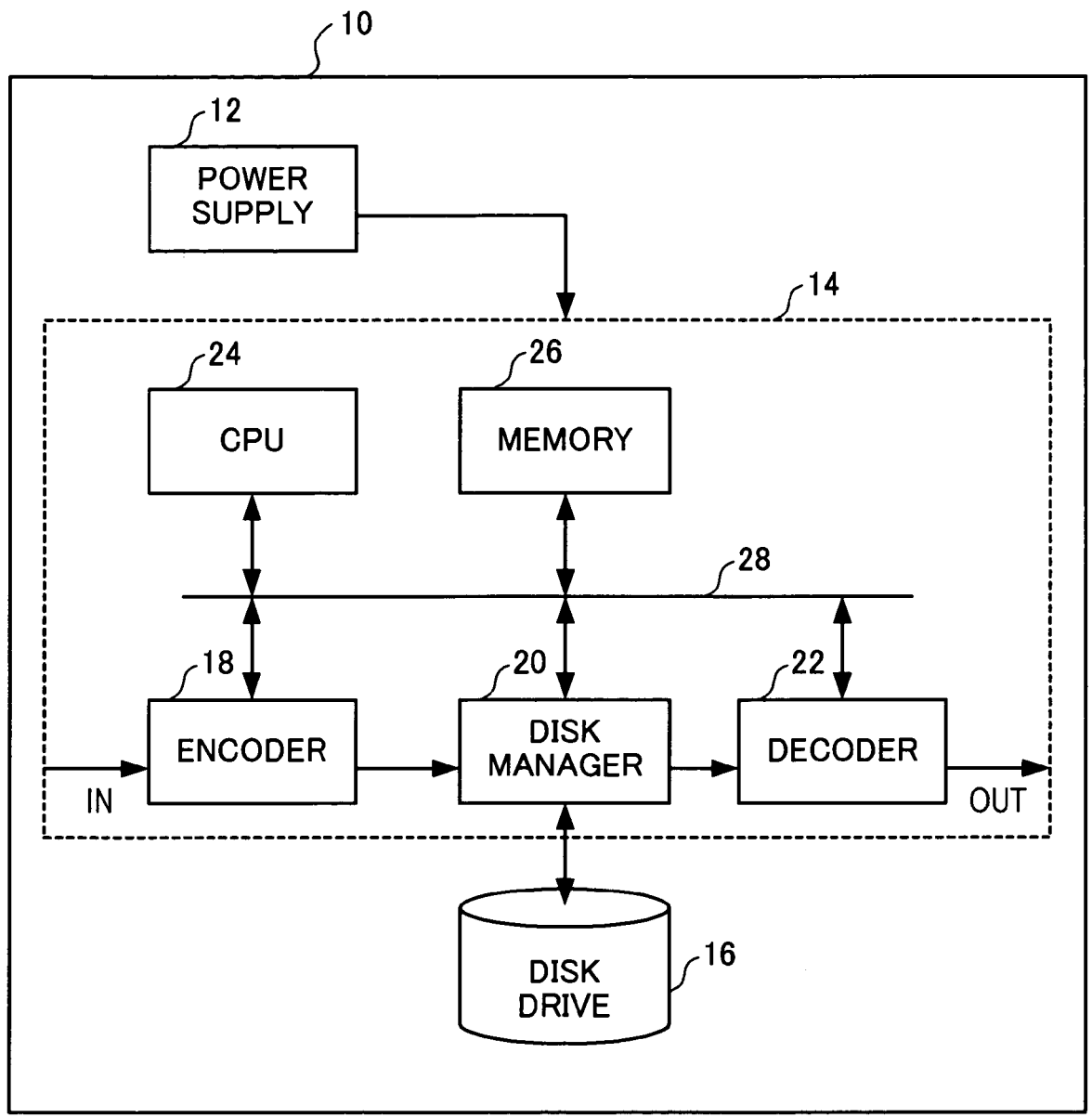
FIG. 1 is a diagram showing the general configuration of a file system according to one embodiment of the present invention.

FIG. 1 is a diagram showing the general configuration of a file system according to one embodiment of the present invention. The file system serves as a hard disk recorder, for example, and comprises: a power supply device 12, a file management apparatus 14 and a disk drive 16, which is a file device. The file management apparatus 14 includes an encoder 18, for digitizing an input signal IN, such as a video or a sound signal, and for encoding or compressing digital data using the MPEG2 method; and a disk manager 20 for writing or reading the encoded or compressed data, to or from the disk drive 16, and a decoder 22 for decompressing or decoding the data which is read. Further, the file management apparatus 14 includes a memory 26 in which is stored a program for controlling the disk management function of the disk manager 20, a CPU 24 for executing a program, and a CPU bus 28 for connecting these components. Therefore, in response to a write command or a read command from the CPU 24 the disk manager 20 writes or reads stream data to or from the disk drive 16.

The file system further comprises a data recording module program for controlling the writing of data on the disk drive 16, a data reading module program for controlling the reading of data, and a FAT restoration module program for restoring a defective file resulting from the occurrence of a power cutoff while data is being recorded in the memory 16.

Figure 2:
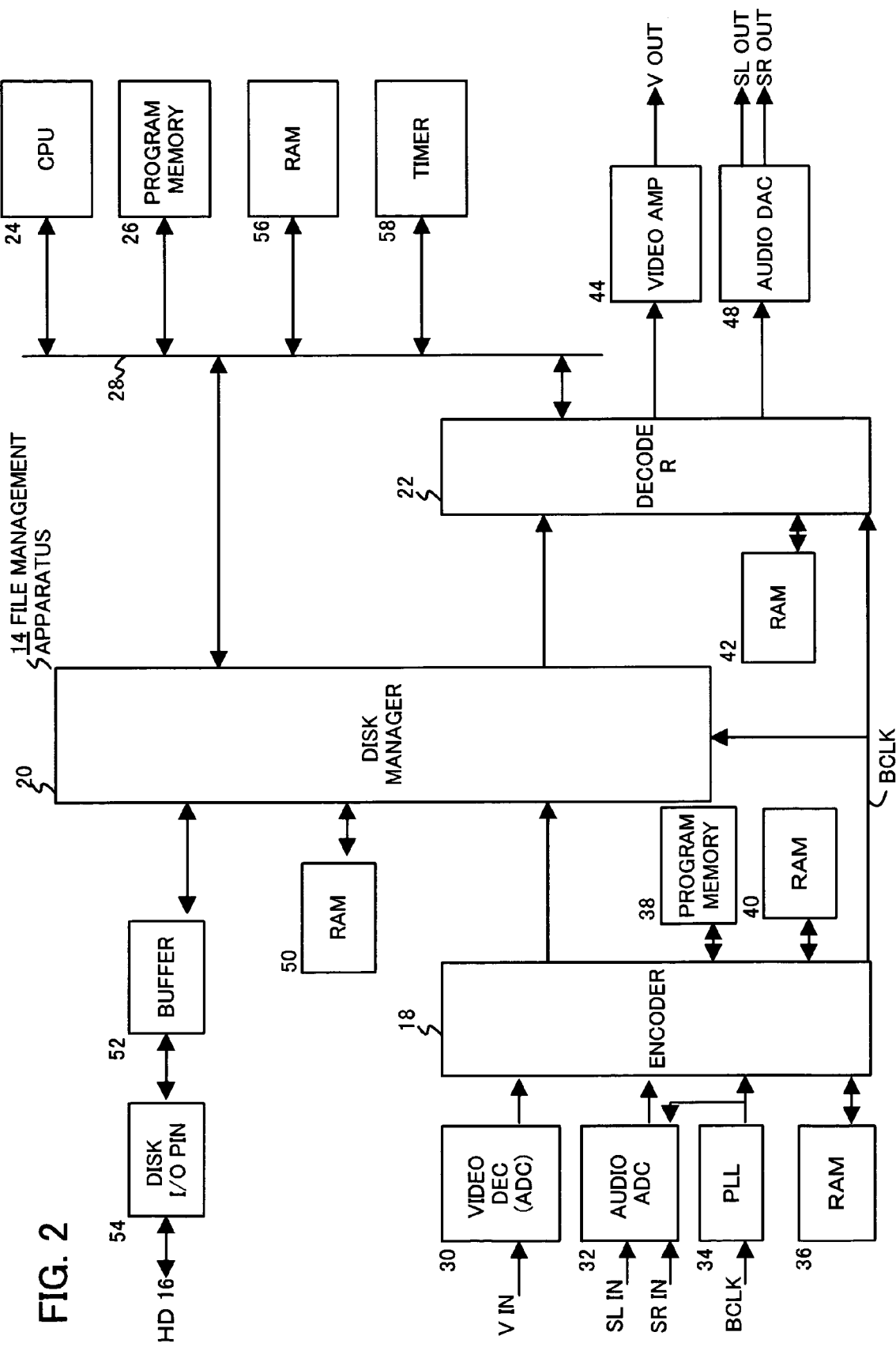
FIG. 2 is a detailed diagram showing the configuration of a file management apparatus according to the embodiment.

FIG. 2 is a detailed diagram showing the configuration of the file management apparatus according to the embodiment. The file management apparatus 14 in FIG. 2 includes the encoder 18, the disk manager 20, the CPU 24, the program memory 26 and the CPU bus 28, all of which are also shown in FIG. 1.

The file management apparatus 14, on the periphery of the encoder 18, further comprises: a video decoder 30, for decoding an analog video input signal Vin, which is a composite signal, in accordance with the NTSC method or the PAL method, and for converting the decoded signal into a digital signal; an analog/digital audio converter 32, for receiving analog audio input signals (right and left audio signals) SLin and SRin, and for converting the input signals into digital signals at a predetermined sampling rate; a PLL circuit 34 for receiving a bit clock BCLK and supplying a sampling clock to a analog/digital audio converter 32; a memory 36 for temporarily storing compressed data; a program memory 38 for storing a control program for the encoder 18; and a temporary data memory 40 for recording encoded data.

The file management apparatus 14 further comprises, for the decoder 22: a video amplifier 44 for amplifying a decompressed or decoded video signal and outputting the obtained analog video signal Vout; a digital/analog audio converter 48 for converting the decompressed or decoded digital audio signal into analog audio signals SLout and SRout; and a temporary data recording memory 42 for recording decoded data.

In addition to the CPU 24 and the program memory 26, a CPU work memory 56 and a timer 58 for recording the recording start time and the end time are also connected to the CPU bus 28. The disk manager 20 incorporates a hard disk interface (IDE interface) and a CPU write/read register, and a disk input/output pin 54 which is connected to the disk manager 20 via a buffer 52 as well as to the disk drive 16. The disk manager 20 can be implemented by a single ASIC, for example, and may be carried out by a system LSI which is integrally formed with the CPU 24 and the memories 26 and 56 which are connected to the CPU bus 28.

In the file management apparatus 14, the input video signal Vin and the input audio signals SLin and SRin are converted into digital signals, the obtained digital signals are encoded or compressed by the encoder 18, and the digital data stream is supplied to the data buffer 52 of the disk manager 20, which thereafter writes the digital data stream to the hard disk drive 16. The operation for recording the stream data is controlled by the data recording module of the program memory 26, and the data is recorded as a new file on the disk drive 16. A specific recording operation will be described later.

Figure 3:
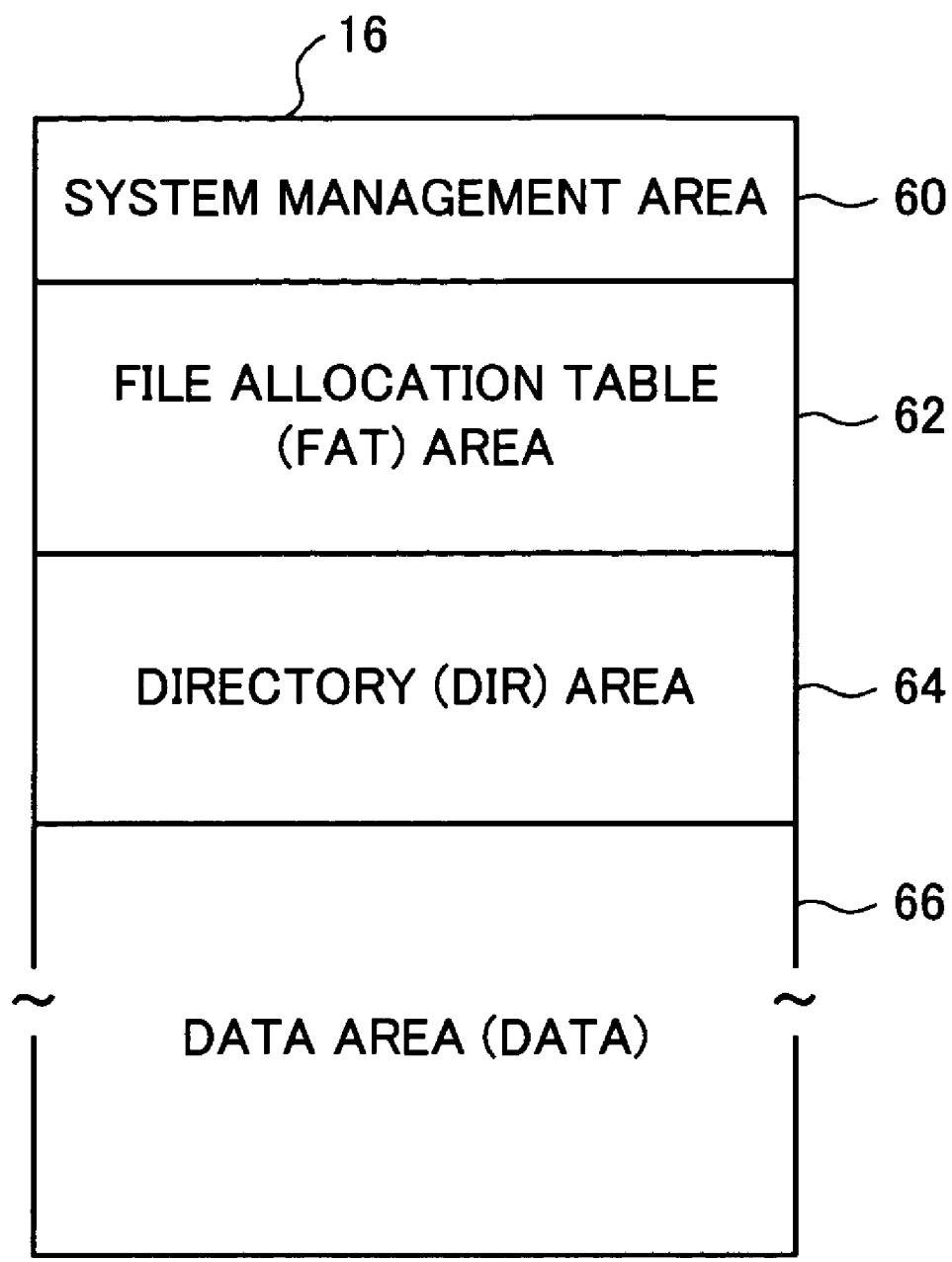
FIG. 3 is a diagram showing the structure of a recording area on a disk drive.

FIG. 3 is a diagram showing the structure of the recording area of the disk drive 16. The basic parameters, such as the cluster size of a data area and the number of created files, are stored in a system management area 60, the size of which is several tens of bytes. A file allocation table (FAT) area 62 consists of a plurality of table areas which are mapped, in a one-to-one physical correspondence, to the clusters in a data area 66. When the size of a FAT is four bytes, the file allocation table area 62 has the capacity obtained by multiplying that size by the number of clusters. A directory (DIR) area 64 has file attribute areas in which attributes, which include file names, file sizes, head FAT pointers and so on, are stored for individual files. File numbers (or file IDS), indicating the location of files and numbered consecutively beginning with the first file in the directory area 64, are also allocated for the file attribute areas respectively. The digits used for the file numbers represent values up to a maximum which equals the total file count. The data area 66 is divided into multiple clusters, and stream data is stored in these clusters. One file is normally constituted by a multiple cluster chain, and cluster allocation information indicating to which file each cluster belongs is stored in the FAT.

Figure 4:
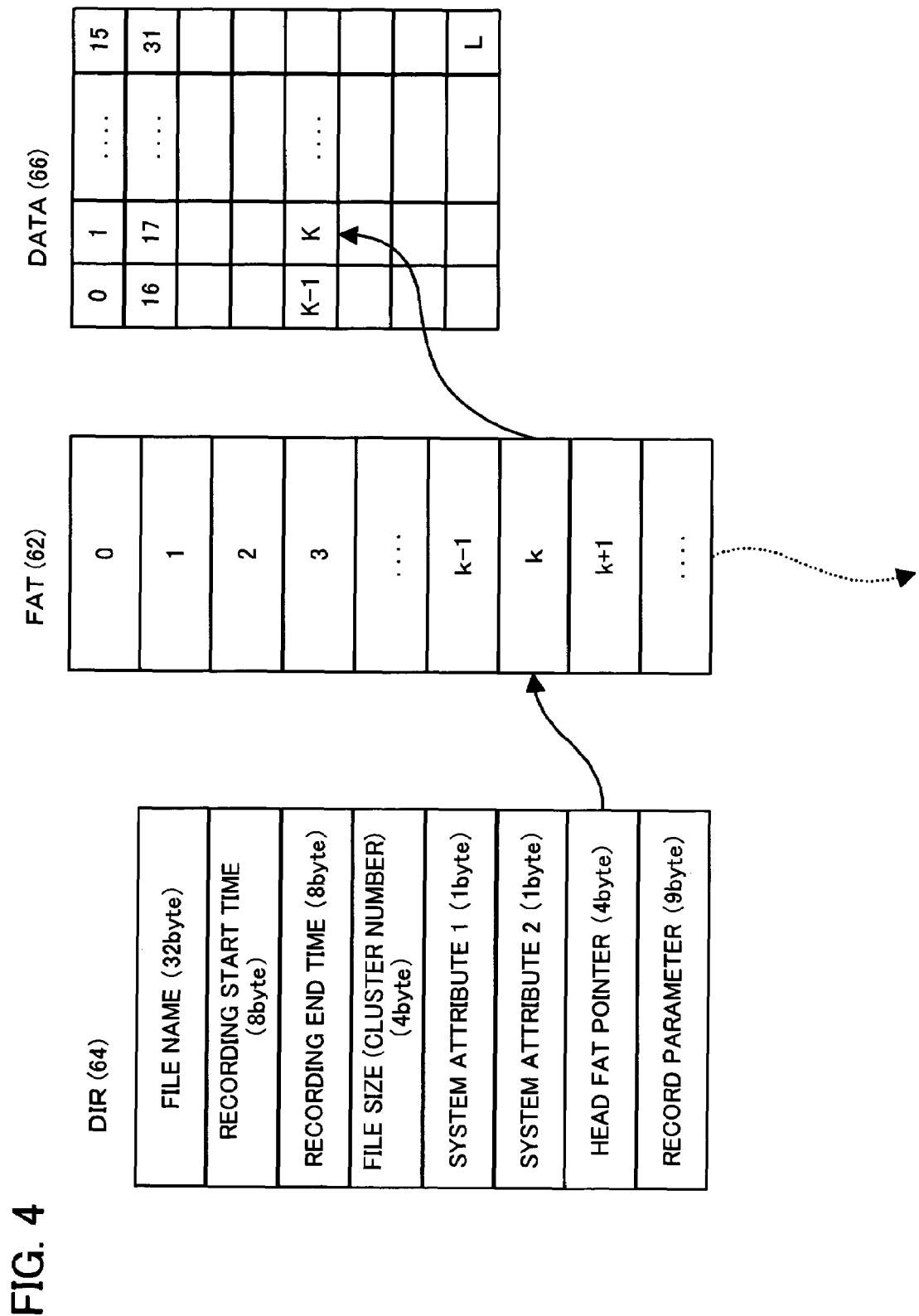
FIG. 4 is a diagram showing the relationship between a directory, a FAT and a data area.

FIG. 4 is a diagram showing the relationship of the directory area 64, the FAT area 62 and the data area 66. The file name, the recording start time, the recording end time, the file size (the number of clusters used), system attributes 1 and 2 indicating whether deletion is inhibited and a file form, the head FAT pointer and various parameters required for recording and reproduction are stored in the file attribute area which is generated for each file in the directory area 64. The parameters required for recording and reproduction are, for example, a multiplexing method (one of MPEG1, MPEG2TS and MPEG2PS), a bit rate (kbps), an encoding mode (either a constant bit rate or a variable bit rate), an encoding video format (NTSC, PAL, etc.), a resolution conversion filter (D1, HD1, SIF, QSIF, 2/3D1, 3/4D1, etc.), a system bit rate coefficient (coefficient representing the maximum change range for a variable bit rate), and an audio sampling frequency. Generally, the default values for these parameters are stored when a new file is created. Example sizes of the individual areas are shown in FIG. 4.

As is shown in FIG. 4, the file name has a 32 byte size, and when a new file is created, a code (8 bytes) which corresponds to a character string of DVR-0000, for example, which is obtained by converting the file number (2 bytes) into a character string, and the Null code for the remaining 24 bytes are stored. After a new file is created, the file name can be changed by a user. It should be noted, however, that a user can not change the file number (file ID).

A plurality of FATs are provided in the FAT area 62, physically and respectively corresponding to plural clusters in the data area 66. In the example in FIG. 4, clusters 0 through K to L are provided in the data area 66, and physically, L+1 FATs are correlated with the respective clusters. The FAT address (K in FIG. 4) corresponding to the first cluster of the plural clusters (the cluster chain) constituting a file is stored at the first FAT pointer in the file attribute area generated in the directory area 64. By referring the first FAT pointer, the first cluster of the plural clusters forming the file can be identified. Further, the address of the succeeding FAT in the FAT chain, which corresponds to the plural clusters (cluster chain) constituting a file, is stored in the FAT. That is, the FAT pointer identifying the succeeding FAT is stored in the FAT. Therefore, when the address (FAT pointer) in the FAT is referred to, the succeeding cluster can be identified.

Figure 5:
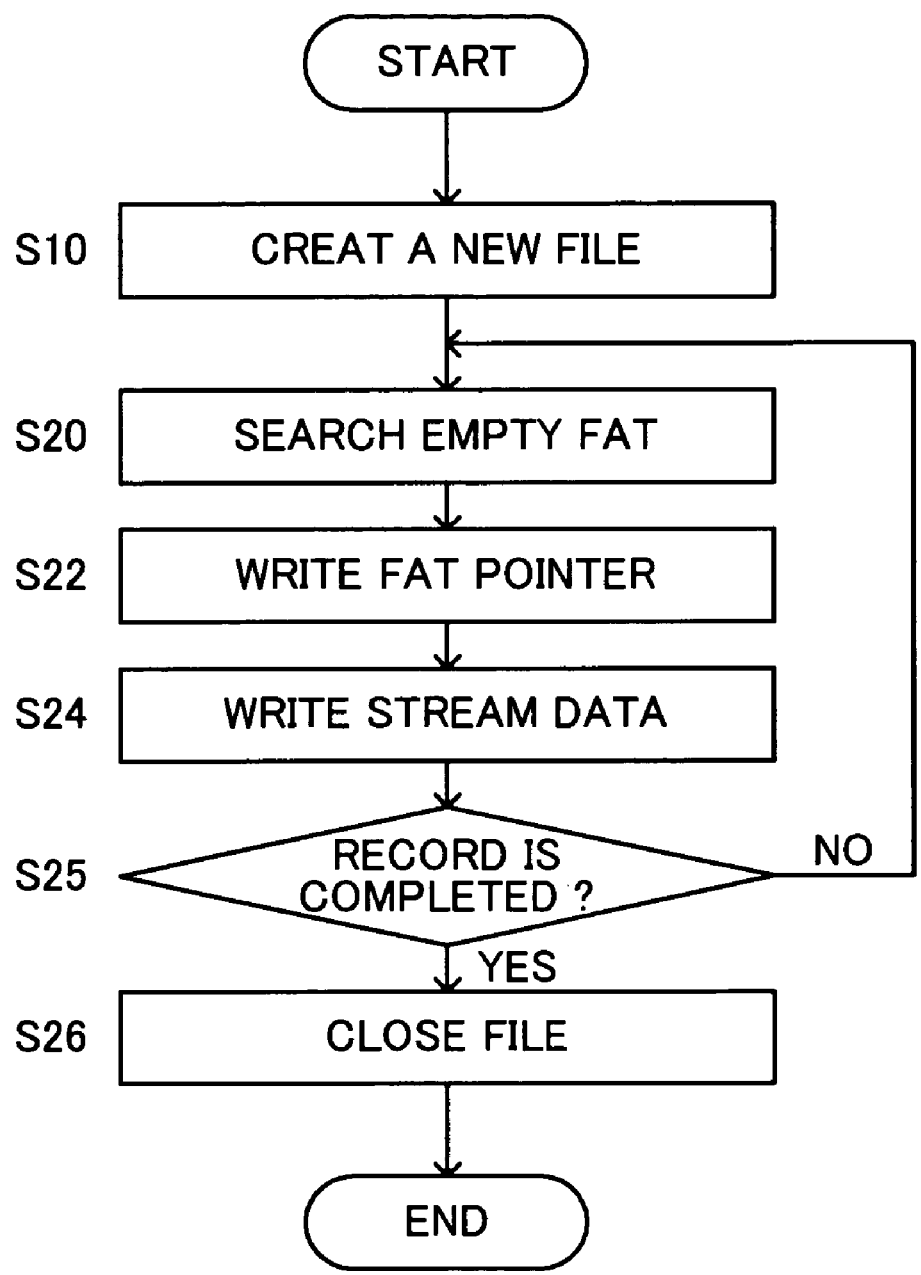
FIG. 5 is a flowchart showing a recording operation.
Figure 6:
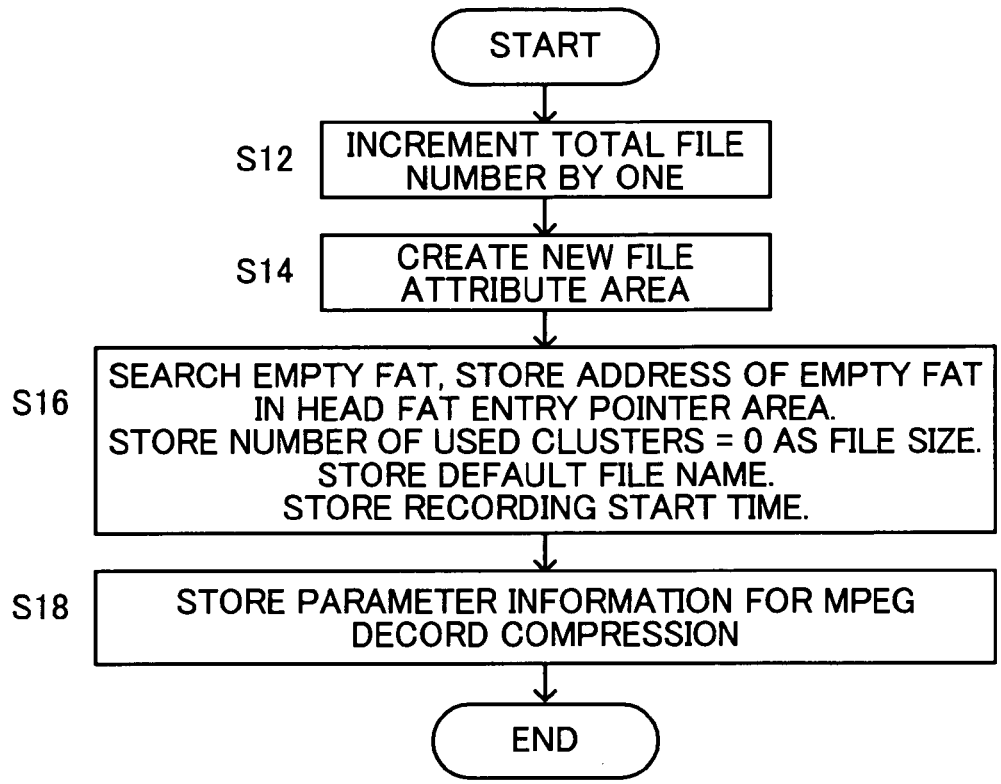
FIG. 6 is a flowchart showing a new file creation sub-routine.
Figure 7:
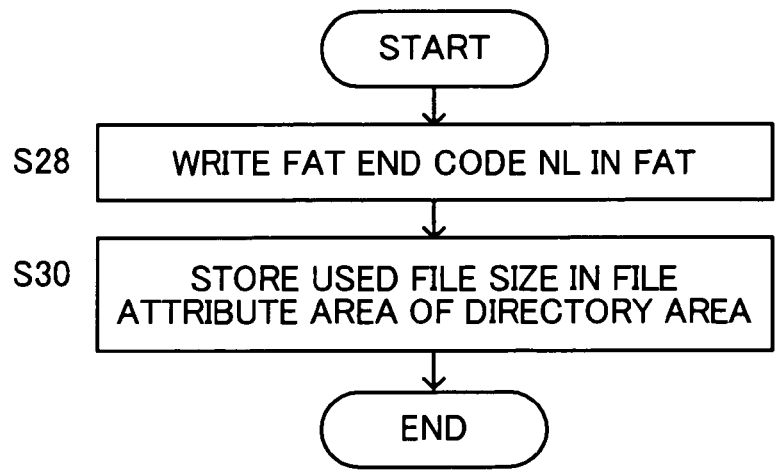
FIG. 7 is a flowchart showing a file closing sub-routine.
Figure 8:
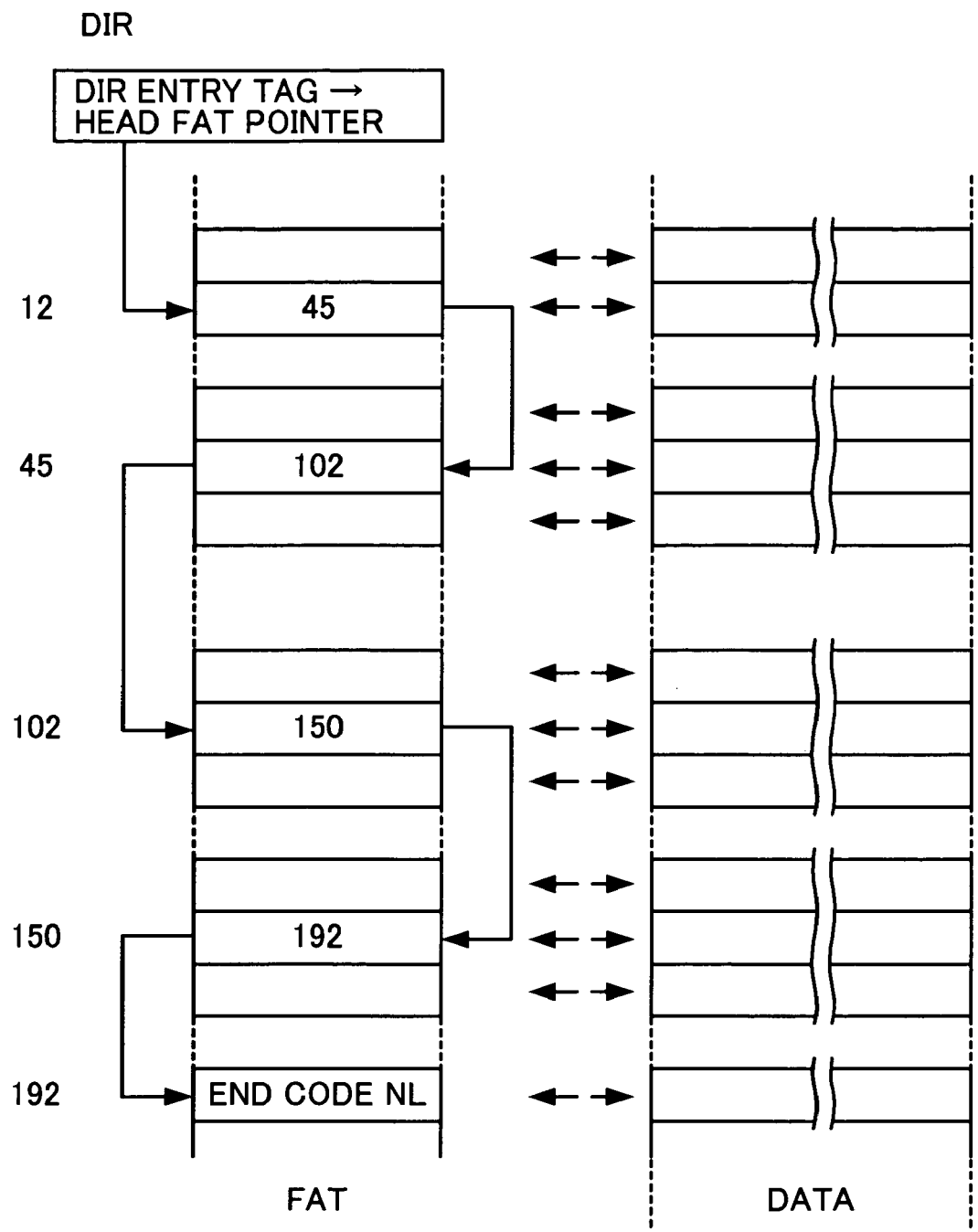
FIG. 8 is a diagram for explaining the recording operation.

FIG. 5 is a flowchart showing the recording operation, FIG. 6 is a flowchart for the new file creation sub-routine in the recording operation, and FIG. 7 is a flowchart for the file closing sub-routine. These flowcharts represent the operations performed by the data recording module program stored in the program memory 26 in FIG. 2, while FIG. 8 is a diagram for explaining the recording operation. The data recording operation will now be described while referring to the flowcharts.

In the initial state wherein the file system is formatted, an unused cluster code uniquely indicating the unused state (empty) of a cluster, e.g. "0xFFFFFFFF" (the most significant value provided by four bytes in the hexadecimal system), is stored in each FAT in the FAT area 62. When a cluster is used, FAT address corresponding to the succeeding cluster or FAT end code is stored in the corresponding FAT. A code that ordinarily will not occur, such as "0xFFFFFFFE", is selected as the FAT end code.

Further, during the initialized state, an initial value of "0xFFFFFFFF", for example, is also stored in the directory area 64.

When the data recording operation is begun, first, a new file is created (S10). In the new file creation sub-routine in FIG. 6, the total number of files in the system management area 60 is incremented by one (S12), and a new file attribute area is prepared in the directory area 64 (S14). For the preparation of the new file attribute area, the directory area 64 is searched and a discovered empty area is allocated as the new file attribute area. As previously described, a unique file number is assigned to this file attribute area.

The attribute data in FIG. 4 are then stored in the allocated new file attribute area (S16). Specifically, the default file name, e.g., a character string obtained by converting the file number, is stored, the time indicated by the timer 58 is stored as the recording start time, and the number of used clusters=0 is stored as the initial value for the file size. Further, the FAT area 62 is searched to find an empty FAT for which no file has been allocated, and the address of the empty FAT is stored in the head FAT pointer. As a result, as is shown in FIG. 4, the first cluster for the new file is designated by the FAT address stored in the FAT pointer. In addition, a default value or a designated value is stored as the recording parameter in the file attribute area (S18). Thereafter, the routine for creating the new file attribute area is terminated.

In the file system of this embodiment, a file number (file ID) of two bytes is allocated for the file attribute area corresponding to each file which is provided in the directory area 64, and such file number is distinguished from the file name. Since the file number is binary data indicating the location of the file attribute area in the directory area 64, the internal process for identifying the file is simplified and can be performed rapidly.

For example, for a time-shifting reproduction in which a TV program is being reproduced while being recorded, a rule must be maintained whereby the reproduction side does not go ahead of the recording side. In this case, it is necessary to determine whether the same file being recorded is currently being reproduced or whether a different file is currently being reproduced, and in this case, to make a quick determination, only the file numbers need be compared. In addition, the file number (file ID) is also employed for the file identification information stored in the FAT map, which will be described later.

For this, employing the file name in the file attribute area of the directory area 64 is not preferable, because since the file name is large, 32 bytes long, the speed for the identification process is slower.

Referring again to FIG. 5, steps S20 to S24 are repeated until the recording of stream data has been completed. First, as to the FAT at the address stored in the first FAT pointer, FAT is searched to find an empty FAT (S20), and the address of the empty FAT is stored as the FAT pointer in the first FAT (S22). Thus, a FAT chain including the first FAT and the second FAT is generated. Then, stream data is written to the cluster corresponding to the first FAT (S24). The size of the cluster is 512 bytes, for example, and corresponds to about 0.5 seconds of the video and audio data. The write operation of the stream data from the encoder 18 is performed in a flow of the disk manager 20, the memory 50 and the disk drive 16 in FIG. 2, and the stream data is finally stored in the cluster designated in the FAT.

When steps S20 to S24 have been completed for the first FAT, the same steps S20 to S24 are performed for the second FAT. In the process for the second FAT, at step S20 the address of the FAT corresponding to the third cluster is stored as the FAT pointer in the second FAT. Steps S20 to S24 are repeated until writing of all the stream data is completed (S25). In this manner, in the current FAT, the next address is stored as the FAT pointer, and a sequential FAT chain is generated.

In the example in FIG. 8, the address of the first FAT is "12", the address of the second FAT is "45", the address of the third FAT is "102", the address of the fourth FAT is "150" and the address of the fifth FAT is "192". These addresses are stored as FAT pointers in the preceding FATs. In this example, the FAT chain is formed of discontinuous addresses; however, in most cases, the FAT chain is formed of sequential addresses.

When all the stream data have been written (S25), the file closing process (S26) is performed. In the file closing process, as is shown in FIG. 7, the FAT end code NL is written to the last FAT (S28), and the number of used clusters is stored as the file size in the file attribute area of the directory area 64 (S30). When the data stream has been written, the succeeding FAT address is stored in the last FAT. Therefore, in the file closing process, the succeeding FAT address is replaced with the end code NL. Further, since the number of clusters=0 is stored when the stream data has been written, in the file closing process the file size is replaced with the number of used clusters.

When the recording operation is started, first, the file size=0 is stored in the file attribute area of the directory area 64, and the first FAT address is stored in the first FAT pointer of the directory area. When the recording operation is normally terminated, the FAT end code NL is stored at the last FAT, and the number of used clusters is stored as the file size. In this embodiment, as will be described later, a defective file is detected while taking the recording control operation into account.

The defective file restoration operation for this embodiment will now be described. According to the previous data recording operation, when power is cut off during data recording and the operation is not normally terminated, the process (1) for changing the FAT pointer of the FAT corresponding to the last cluster into the end code NL, and the process (2) for changing the file size into the number of used clusters are incomplete. Therefore, the defective file can be detected if (1) the FAT pointer of the FAT corresponding to the last cluster is not the end code, and (2) the file size is maintained as the initial value (=0). In this embodiment, the restoration of the defective file is implemented while taking this state into account.

Figure 9:
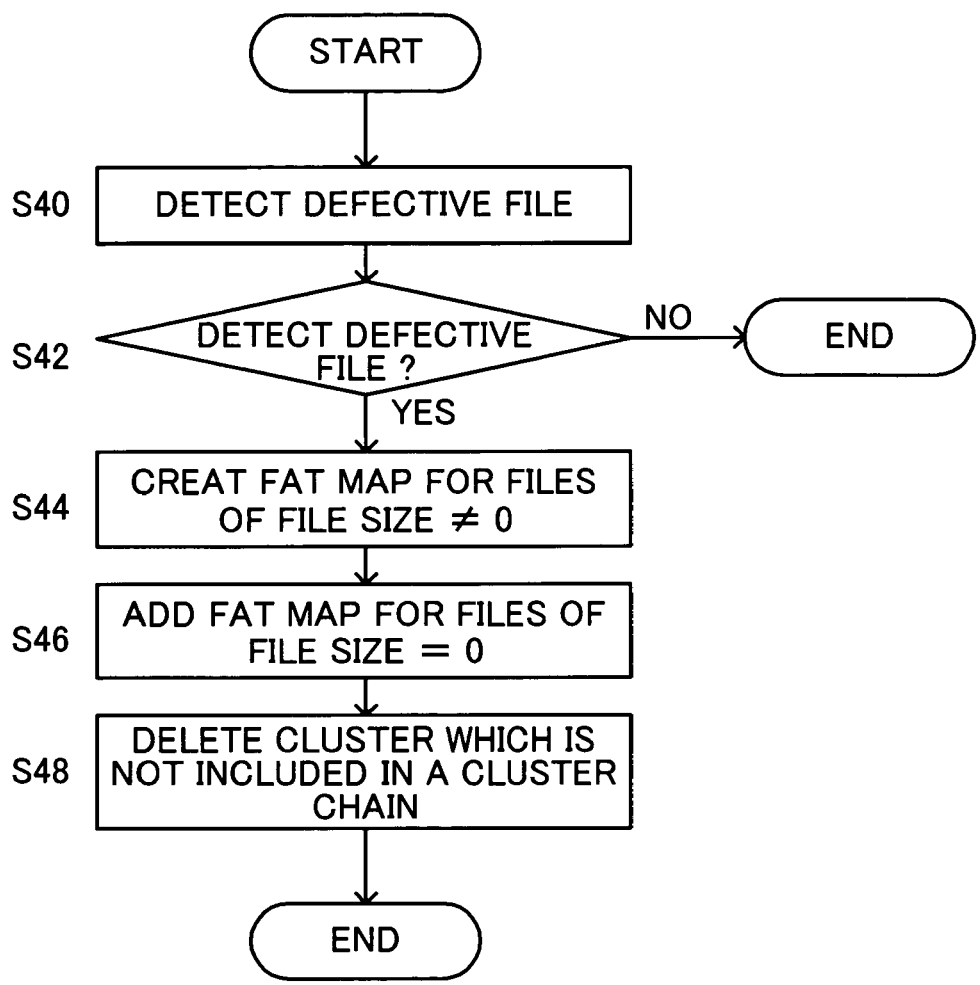
FIG. 9 is a flowchart showing the defective file restoration processing according to the embodiment.

FIG. 9 is a flowchart showing the defective file restoration processing, and FIGS. 10A to 10D are diagrams showing an example used for explaining the defective file restoration processing. The FAT state before the restoration is shown in FIG. 10A, the FAT state after the restoration is shown in FIG. 10B, and FAT maps created during the restoration operation are shown in FIGS. 10C and 10D. For the tables in FIGS. 10A to 10D, written in the leftmost columns are four digit hexadecimal addresses and written across the rows are least significant bits of 00 to 0F. For the tables in FIGS. 10A and 10B, FAT pointers are written for the FAT states, and the unused cluster code for the initial value is stored in empty columns. In the FAT maps in FIGS. 10C and 10D, file numbers are written.

For the explanation of the restoration, assume that the following files are created.
 file 1: first FAT=00, file size=4
 file 2: first FAT=04, file size=9
 file 3: first FAT=15, file size=14
 file 4: first FAT=09, file size=0 (actual size=4)
 file 5: first FAT=12, file size=0 (actual size=3)
 file 6: first FAT=0D, file size=0 (actual size=0)

The above first FAT pointer and the file size are written in the file attribute area in the directory area 64. The actual file size can be detected by analizing the FAT state, but can not be detected by referring to the directory area 64 due to file size=0.

In the above example, files 1, 2 and 3 are normal files because their file sizes are other than the initial value=0. Files 4, 5 and 6 are detective files because their file sizes are maintained as the initial value=0.

As shown at right side of the FAT state table in FIG. 10A, according to the FAT state before the restoration shown in FIG. 10A, file 1 has a first FAT address of "00" and a FAT chain of 00-01-02-03. Further, file 2 has a first FAT address of "04" and a FAT chain of 04-05-06-07-08-1A-1B-1C-1D, and file 3 has a first FAT address of "15" and a FAT chain of 15-16-17-18-19-1E-1F-20-21-22-23-24-25-26. These are all normal files, and the FAT pointers stored in the last FATs "03", "1D" and "26", are end code NLs.

In addition, file 4 has a first FAT address of "09", and a FAT chain of 09-0A-0B-0C, and the FAT pointer value of the FAT "0D", supposed to be the last FAT, is unused cluster code (an empty column). Therefore, it is assumed that the recording operation was interrupted by a power cutoff, when the data stream is recorded in the cluster corresponding to FAT "0C". Therefore, the actual last FAT is "0C", which immediately precedes "0D".

File 5 has a first FAT address of "12" and a FAT chain of 12-13-14, and the FAT pointer of the last FAT "14" is "15". Since the FAT "15" overlaps the first FAT for file 3, it can be assumed that the recording of file 5 was also interrupted by the power cutoff while data is recorded up to the cluster corresponding to the FAT "14". Therefore, the actual last FAT is "14", which immediately precedes "15".

For file 6, the first FAT address is "0D", and the unused cluster code (an empty column) is stored as the FAT pointer in the FAT "0D". Therefore, it is assumed that for file 6, a new file attribute area is prepared in the directory area 64; however, the power was cut off before a FAT pointer or data were written to the FAT and the cluster.

An explanation will now be given for the defective file restoration processing for the FAT state before the above referenced restoration. In FIG. 9, the FAT restoration module searches the directory area 64 and detects a defective file (S40). For this detection, whether the file size of the file attribute area is maintained as the initial value of 0 is determined. When a defective file is present (S42), steps S44, S46 and S48 are performed.

At step S44, a normal file whose file size is other than the initial value of 0 is detected in the file attribute area of the directory area 64, and a FAT map is prepared for the detected normal file. The FAT map is a table to represent to which file each FAT corresponds, and is temporarily employed to restore a defective file. Therefore, the FAT map is prepared, for example, in the CPU work memory 56 or in the temporary area of the disk drive 16. When the upper limit for the number of files for the file system is defined as a maximum 65535 files, which can be represented by two bytes ($2^{16}$), the individual areas in the FAT map have capacities of two bytes each, and the FAT map has a capacity of a multiple of the number of clusters therewith. Further, at the beginning, the FAT map is initialized by an unused code, such as 0xFFFF.

A normal file 1 whose file size is other than the initial value of 0 is detected, the FAT address of the used cluster is detected from the head FAT pointer and the FAT state of the file 1, and the file number "01" is sequentially stored in the corresponding addresses in the FAT map. As a result, in the FAT map in FIG. 10C, file number "01" is stored at addresses 00-02-03. The same process is performed for normal files 2 and 3, and file numbers "02" and "03" are stored in the FAT map in FIG. 1C. These processes can be easily performed by detecting used clusters based on the head FAT pointer, the file size and the end cluster code NL. As a result, the currently used clusters of the normal files can be mapped in the FAT map.

At step S46, the file number of a defective file whose file size is maintained as the initial value of 0 is added to the FAT map. As a result, the FAT map in FIG. 10D is generated. During this process, as well as at step S44, while the head FAT pointer and the FAT pointer in the FAT are referred to, the file number is entered in the corresponding addresses of the FAT map. It should be noted, however, that since the file size of a defective file is maintained as 0 and the end cluster code NL has not yet been written in the FAT pointer following the last FAT entry, the series of FATs before the following conditions are detected are defined as one file:

Condition 1: The FAT pointer is an unused cluster code (case for file 4);

Condition 2: The code in the FAT map is not an unused code, but a file number code which is already present (case for file 5); and Condition 3: The FAT pointer in the FAT pointed to by the head FAT pointer is an unused cluster code (case for file 6).

A cluster counter for recording the file size is set up in the work memory 56, and each time the file number of the defective file is stored in the FAT map, the value of the cluster counter is incremented by one in order to count the file size at the same time.

For the file 4, a series of addresses 09-0A-0B-0C, from the head FAT pointer of "09" until condition 1 is satisfied, are detected as used clusters, and file number "04" is stored in the corresponding addresses of the FAT map. The cluster counter value at this time is four. For the file 5, a series of addresses 12-13-14, from the head FAT pointer "12" until condition 2 is satisfied, are defined as used clusters, and file number "05", is stored in the corresponding addresses of the FAT map. Since the file number "03" of the normal file is already stored at address "15" of the FAT map, it is determined that the used clusters of file 5 continue up to the address "14". The cluster counter value in this case is three.

Since the used clusters have been detected for files 4 and 5, as is shown in FIG. 10B, the end cluster code NL is written in the last FATs "0C" and "14" for the FAT strings, and the file sizes in the file attribute areas of the directory areas 64 are replaced with the number of used clusters that were detected. The address of the last FAT can be obtained by referring to the FAT string and the FAT map.

For file 6, since the head FAT pointer "0D" corresponds to condition 3, only file number "06" need be stored at address "0D" in the FAT map. However, for file 6, an unused cluster code is stored at address "0D" of FAT. Therefore, the cluster corresponding to the address "0D" is unused state and it is determined that no data has been written in the cluster for file 6. As a result, since no stream data has been recorded for file 6, a file deletion process is performed.

The file deletion process is a process of initializing a directory area 64 and a FAT area 62 corresponding to the deleting file. For file 6, the initial value is stored in the corresponding file attribute area of the directory area 64, however since no FAT pointer is stored in the FAT area 62, no particular process is performed for the FAT area 62. During the file deletion process, an initial value is stored in a series of FATs of the file size, beginning with the FAT in the head FAT pointer. For file 6, since the file size is maintained as 0, the initialization of the FAT is not performed, and as a result, address "0D" of the FAT in FIG. 10B is maintained as an unused cluster code (an initial value).

At step S48, a cluster which is not included in a cluster chain indicating currently used clusters is changed from the used state to the unused state. Specifically, the FAT map in FIG. 10D is compared with the FAT in FIG. 10B for all addresses to determine whether a contradictory state exists. A contradictory state is, for example, a case wherein code other than the unused cluster code is stored in the FAT while the FAT map is empty (an initial value), or where the unused cluster code is stored in the FAT, while a code other than the initial value is stored in the FAT map.

According to the first case, code other than the unused cluster code is stored in the FAT, although as a result of the examination based on the file attribute area of the directory area 64 the cluster is determined to be unused. Since at the creation of a new file, this cluster is not detected as an empty cluster, so that the data can not thereafter be recorded in the cluster. Therefore, to restore the clusters, the unused cluster code is written in the corresponding FAT to enable the use of the cluster thereafter. The second case is a state which can not normally occur, and in the file deletion process, only the directory area is initialized.

Through this restoration processing, a defective file wherein data seems to be recorded in the clusters is restored as a normal file within the range of these clusters. Further, a defective file wherein data does not seem to be recorded in the clusters is deleted. Therefore, the normal files are recovered without most of the recorded data being deleted.

In this embodiment, the FAT map is created first for a normal file, and is then created for a defective file. Thus, clusters in the normal file can be prevented from being replaced by clusters in a defective file (e.g., the cluster in the last FAT entry for file 4 or 5) that may have been erroneously designated. Further, by employing the fact that in the data recording operation, the file size is set to the initial value (=0) first, a defective file can be detected by only referring the file size of the file attribute area of the directory area 64.

Furthermore, in the embodiment, the file management apparatus 14 is carried out as a system board including multiple semiconductor devices; however, it may be implemented by a system LSI wherein the file manager 20, the CPU 24, the program memory 26, the RAM 56 and the timer 58 are integrally formed.

The defective file restoration processing may be performed upon the reception of an active instruction from the user, or at a time periodically designated by the timer. That is, the FAT restoration module in the program memory 26 is executed when a restoration is required.

According to the present invention, a defective file can be restored without power source monitoring means or a battery being required, and without the creation of overlapping FATs.

What is claimed is:

1. A file management apparatus for a file system, including a data area divided into a plurality of clusters, a file allocation table (FAT) having a plurality of table areas mapped in accordance with said clusters, and a directory having a file attribute area containing at least a file name and a head FAT pointer, comprising:

a processor; and a memory having instructions executed by the processor to perform:

during data recording, repetitively writing data in a cluster corresponding to a currently processed FAT and storing a succeeding FAT address in said currently processed FAT to generate a FAT chain; and restoring a FAT of a destroyed file by generating a FAT map by storing a file number in a map area corresponding to each FAT of said FAT chain for each file, when data recording is not normally terminated, in accordance with the head FAT pointer in said file attribute area of said directory and said FAT chain, and storing an end code in a FAT corresponding to an end of the destroyed file stored in said FAT map in which a file number of the destroyed file is stored, by referring to said generated FAT map.

2. A file management apparatus for a file system, including a data area divided into a plurality of clusters, a file allocation table (FAT) having a plurality of table areas mapped in accordance with said clusters, and a directory having a file attribute area containing at least a file name, a head FAT pointer and a file size of a number of said clusters, comprising:

a processor; and
a memory having instructions executed by the processor to perform:
during data recording, setting a head FAT address for said head FAT pointer and an initial value for said file size (cluster number) to generate a new file attribute area in said directory, repetitively writing data in a cluster corresponding to a currently processed FAT while storing a succeeding FAT address in said currently processed FAT to generate a FAT chain, and writing an end code in a last FAT and writing a number of used clusters as said file size in said file attribute area of said directory to finish a recording operation; and
restoring a FAT of a destroyed file by searching said file attribute area of said directory to detect a first file having a file size other than said initial value, when data recording is not normally terminated, generating a FAT map by storing a file number of said first file in a map area corresponding to each FAT of the FAT chain of said detected first file, and by additionally storing, in said FAT map, a file number of a second file having a file size of said initial value.

3. The file management apparatus according to claim 2, wherein:
said restoring a FAT searches said file attribute area of said directory to detect said second file having as the file size said initial value, and stores: a file number of said second file sequentially, beginning with a map area corresponding to the head FAT pointer of said file attribute area and extending up to a map area corresponding to a FAT immediately preceding a FAT which is included in said FAT chain and which stores an unused cluster code.

4. The file management apparatus according to claim 3, wherein:
by referring to said created FAT map, said restoring a FAT stores an end code in a FAT corresponding to an end of said FAT map in which the file number of said second file is stored.

5. The file management apparatus according to claim 4, wherein:
said restoring a FAT compares data in said FATs with the data in said FAT map; and
when a file number is not stored in said FAT map and a code other than the unused cluster code is stored in a corresponding FAT, said restoring a FAT stores the unused cluster code in said corresponding FAT.

6. The file management apparatus according to claim 2, wherein:
said restoring a FAT searches said file attribute area of said directory to detect said second file having as said file size said initial value, and stores: a file number of said second file sequentially, beginning with a map area corresponding to the head FAT pointer of said file attribute area and extending up to a map area corresponding to a FAT immediately preceding a FAT which is included in said FAT chain and which stores another file number.

7. The file management apparatus according to claim 6, wherein:
by referring to said created FAT map, said restoring a FAT stores an end code in a FAT corresponding to an end of said FAT map in which the file number of said second file is stored.

8. The file management apparatus according to claim 7, wherein:
said restoring a FAT compares data in said FATs with the data in said FAT map; and
when a file number is not stored in said FAT map and a code other than the unused cluster code is stored in a corresponding FAT, said restoring a FAT stores the unused cluster code in said corresponding FAT.

9. The file management apparatus according to claim 2, wherein:
said restoring a FAT searches said file attribute area of said directory to detect said second file having as said file size the initial value; and
when an unused cluster code is stored in a FAT corresponding to the head FAT pointer of said file attribute area, said restoring a FAT stores a file number of said second file in a map area corresponding to said FAT of the unused cluster code.

10. The file management apparatus according to claim 9, wherein:
said restoring a FAT initializes the file attribute area which stores as the head FAT pointer an address of a FAT corresponding to said FAT map in which said file number of said second file is stored.

11. The file management apparatus according to claim 10, wherein:
said restoring a FAT compares data in said FATs with the data in said FAT map; and
when a file number is not stored in said FAT map and a code other than the unused cluster code is stored in a corresponding FAT, said restoring a FAT stores the unused cluster code in said corresponding FAT.

12. The file management apparatus according to claim 2, wherein:
when said FATs are initialized, an unused cluster code is stored in each of said FATs.

13. The file management apparatus according to claim 2, further comprising:
an encoder encoding an input video signal and/or an input audio signal; and
a decoder decoding said encoded data, wherein:
data encoded by said encoder is stored sequentially in said cluster, and
said encoded data is read from said cluster and decoded by said decoder.

14. A file system, comprising:
a file device, including a data area divided into a plurality of clusters, a file allocation table (FAT) having a plurality of table areas mapped in accordance with said clusters, and a directory having a file attribute area containing at the least a file name and a head FAT pointer; and
a file management apparatus, comprising:
a processor;
a memory having instructions executed by the processor to perform:

during data recording, repetitively writing data in a cluster corresponding to a currently processed FAT and storing a succeeding FAT address in said currently processed FAT to generate a FAT chain, and restoring said FAT of a destroyed file by generating a FAT map by storing a file number in a map area corresponding to each FAT of said FAT chain for each file, when data recording is not normally terminated, in accordance with the head FAT pointer in said file attribute area of said directory and said FAT chain, and storing an end code in a FAT corresponding to an end of the destroyed file stored in said FAT map in which a file number of the destroyed file is stored, by referring to said generated FAT map.

15. The file system according to claim 14, wherein said file device is a hard disk drive.

16. The file system according to claim 14, wherein data recorded in said data area is stream data obtained by encoding a video signal and/or an audio signal.

17. A file system, comprising:

a file device, including a data area divided into a plurality of clusters, a file allocation table (FAT) having a plurality of table areas mapped in accordance with said clusters, and a directory having a file attribute area containing at the least a file name, a head FAT pointer and a file size of a number of said clusters; and a file management apparatus, comprising:

a processor; and a memory having instructions executed by the processor to perform:

during data recording, setting a head FAT address for said head FAT pointer and an initial value for said file size (cluster number) to generate a new file attribute area in said directory, repetitively writing data in a cluster corresponding to a currently processed FAT while storing a succeeding FAT address in said currently processed FAT to generate a FAT chain, and writing an end code in a last FAT and writing a number of used clusters as said file size in said file attribute area of said directory to finish a recording operation, and restoring a FAT of a destroyed file by searching said file attribute area of said directory to detect a first file having a file size other than said initial value, when data recording is not normally terminated, generating a FAT map by storing a file number of said first file in a map area corresponding to each FAT of the FAT chain of said detected first file, and by additionally storing, in said FAT map, a file number of a second file having a file size of said initial value.

18. The file system according to claim 17, wherein:

said restoring a FAT searches said file attribute area of said directory to detect said second file having as the file size said initial value, and stores a file number of said second file sequentially, beginning with a map area corresponding to the head FAT pointer of said file attribute area and extending up to a map area corresponding to a FAT immediately preceding a FAT which is included in said FAT chain and stores an unused cluster code.

19. The file system according to claim 17, wherein:

said restoring a FAT searches said file attribute area of said directory to detect said second file having as said file size said initial value, and stores a file number of said second file sequentially, beginning with a map area corresponding to the head FAT pointer of said file attribute area and extending up to a map area corresponding to a FAT immediately preceding a FAT which is included in said FAT chain and stores another file number.

20. The file system according to claim 17, wherein:

said restoring a FAT restoration modulo searches said file attribute area of said directory to detect said second file having as said file size the initial value; and wherein, when an unused cluster code is stored in a FAT corresponding to the head FAT pointer of said file attribute area, said restoring a FAT stores a file number of said second file in a map area corresponding to said FAT of the unused cluster code.

21. the file system according to claim 17, wherein said file device is a hard disk drive.

22. The file system according to claim 17, wherein data recorded in said data area is stream data obtained by encoding a video signal and/or an audio signal.

* * * * *

UNITED STATES PATENT AND TRADEMARK OFFICE
CERTIFICATE OF CORRECTION

PATENT NO. : 7,246,139 B2
APPLICATION NO. : 10/154848
DATED : July 17, 2007
INVENTOR(S) : Tsuyoshi Andoh It is certified that error appears in the above-identified patent and that said Letters Patent is hereby corrected as shown below:

Title Page, Column 1 (Title), Line 2, change "DEFFECTIVE" to --DEFECTIVE--.

Title Page, Column 2 (Other Publications), Line 1, change "bsed" to --based--.

Title Page, Column 2 (Other Publications), Line 3, change "Confrence" to --Conference--.

Title Page, Column 2 (Other Publications), Line 4, change "Intergrating" to --Integrating--.

Column 1 (Title), Line 2, change "DEFFECTIVE" to --DEFECTIVE--.

Column 14, Line 29, after "a FAT" delete "restoration modulo".

Column 14, Line 37, change "the" to --The--.

Signed and Sealed this

Fifteenth Day of April, 2008

JON W. DUDAS
*Director of the United States Patent and Trademark Office*